US011230253B2

(12) United States Patent
Hellot

(10) Patent No.: US 11,230,253 B2
(45) Date of Patent: Jan. 25, 2022

(54) FRONTAL AIRBAG UNIT AND MOTOR VEHICLE

(71) Applicant: Autoliv Development AB, Vargarda (SE)

(72) Inventor: Laurent Hellot, La Feuillie (FR)

(73) Assignee: Autoliv Development AB, Vargarda (SE)

( * ) Notice: Subject to any disclaimer, the term of this patent is extended or adjusted under 35 U.S.C. 154(b) by 19 days.

(21) Appl. No.: 16/762,243

(22) PCT Filed: Oct. 24, 2018

(86) PCT No.: PCT/EP2018/079120
§ 371 (c)(1),
(2) Date: May 7, 2020

(87) PCT Pub. No.: WO2019/091781
PCT Pub. Date: May 16, 2019

(65) Prior Publication Data
US 2021/0179006 A1   Jun. 17, 2021

(30) Foreign Application Priority Data
Nov. 9, 2017  (EP) .................................. 17200773

(51) Int. Cl.
*B60R 21/233*  (2006.01)
*B60R 21/214*  (2011.01)
(Continued)

(52) U.S. Cl.
CPC .......... *B60R 21/233* (2013.01); *B60R 21/214* (2013.01); *B60R 21/239* (2013.01);
(Continued)

(58) Field of Classification Search
CPC ... B60R 21/213; B60R 21/214; B60R 21/232; B60R 21/233; B60R 21/239;
(Continued)

(56) References Cited

U.S. PATENT DOCUMENTS 4,298,214 A * 11/1981 Brown, Jr. ............. B60R 21/213
280/735
5,575,497 A * 11/1996 Suyama ................ B60R 21/231
280/730.1
(Continued)

FOREIGN PATENT DOCUMENTS

DE        198 60 933 A1    7/2000
DE   20 2016 105912 U1    1/2017
(Continued)

OTHER PUBLICATIONS

International Search Report of the International Searching Authority for PCT/EP2018/079120 dated Nov. 13, 2018.

*Primary Examiner* — Laura Freedman
(74) *Attorney, Agent, or Firm* — Stoel Rives LLP

(57) ABSTRACT

A frontal airbag unit adapted for being mounted above the person to be protected is described. It comprises an inflator (24) and an airbag consisting of a first outer skin (10) enclosing a filling and support chamber (20) and a second outer skin (30) enclosing a protection chamber (40). In order simplify the production process and in order to provide a good support for the deployed second outer skin (30) the first outer skin (10) is comprised of a first layer (11) and a second layer (12) being connected to one another by means of a first peripheral connection such that the filling and support chamber (20) is relatively flat.

16 Claims, 9 Drawing Sheets

(51) Int. Cl.
B60R 21/239 (2006.01)
B60R 21/231 (2011.01)

(52) U.S. Cl.
CPC ............... *B60R 2021/23107* (2013.01); *B60R 2021/23308* (2013.01)

(58) Field of Classification Search
CPC .. B60R 2021/0004; B60R 2021/23107; B60R 2021/23308; B60R 2021/23316; B60R 2021/23324
See application file for complete search history.

(56) References Cited

U.S. PATENT DOCUMENTS

| | | | | |
|---|---|---|---|---|
| 5,602,734 | A * | 2/1997 | Kithil | B60N 2/002 180/282 |
| 6,073,960 | A * | 6/2000 | Viano | B60R 21/231 280/730.1 |
| 6,338,498 | B1 * | 1/2002 | Niederman | B60R 21/213 280/728.2 |
| 6,431,586 | B1 * | 8/2002 | Eyrainer | B60R 21/213 280/730.1 |
| 6,457,740 | B1 * | 10/2002 | Vaidyaraman | B60R 21/231 280/730.2 |
| 6,616,177 | B2 * | 9/2003 | Thomas | B60R 21/232 280/729 |
| 6,722,691 | B1 * | 4/2004 | Håland | B60R 21/214 280/730.1 |
| 6,808,198 | B2 * | 10/2004 | Schneider | B60R 21/237 280/730.1 |
| 6,851,706 | B2 * | 2/2005 | Roberts | B60R 21/23138 280/730.1 |
| 6,932,380 | B2 * | 8/2005 | Choi | B60R 21/232 280/730.1 |
| 6,966,579 | B2 * | 11/2005 | Schneider | B60R 21/2338 280/728.2 |
| 7,025,376 | B2 * | 4/2006 | Dominissini | B60R 21/233 280/729 |
| 7,029,030 | B2 * | 4/2006 | Amamori | B60R 21/23 280/730.1 |
| 7,152,873 | B2 * | 12/2006 | Peng | B60R 21/232 280/730.1 |
| 7,185,913 | B2 * | 3/2007 | Bakhsh | B60R 21/02 280/730.1 |
| 8,579,321 | B2 * | 11/2013 | Lee | B60R 21/233 280/729 |
| 9,533,650 | B2 | 1/2017 | Le Norcy et al. | |
| 9,676,361 | B2 * | 6/2017 | Smith | B60R 21/214 |
| 10,246,043 | B2 * | 4/2019 | Schneider | B60R 21/207 |
| 10,471,923 | B2 * | 11/2019 | Jimenez | B60R 21/2338 |
| 10,583,799 | B2 * | 3/2020 | Schneider | B60R 21/214 |
| 10,836,337 | B2 * | 11/2020 | Shin | B60R 21/214 |
| 10,974,685 | B2 * | 4/2021 | Kwon | B60R 21/26 |
| 2002/0024200 | A1 | 2/2002 | Eckert et al. | |
| 2002/0140209 | A1 * | 10/2002 | Waid | B60R 21/232 280/728.2 |
| 2005/0001412 | A1 * | 1/2005 | Schneider | B60R 21/232 280/730.1 |
| 2005/0070414 | A1 | 3/2005 | Schneider et al. | |
| 2014/0232092 | A1 | 8/2014 | Le Norcy et al. | |
| 2017/0113646 | A1 | 4/2017 | Lee et al. | |

FOREIGN PATENT DOCUMENTS

| | | |
|---|---|---|
| EP | 2 686 206 A1 | 1/2014 |
| EP | 2 686 206 B1 | 11/2014 |

* cited by examiner

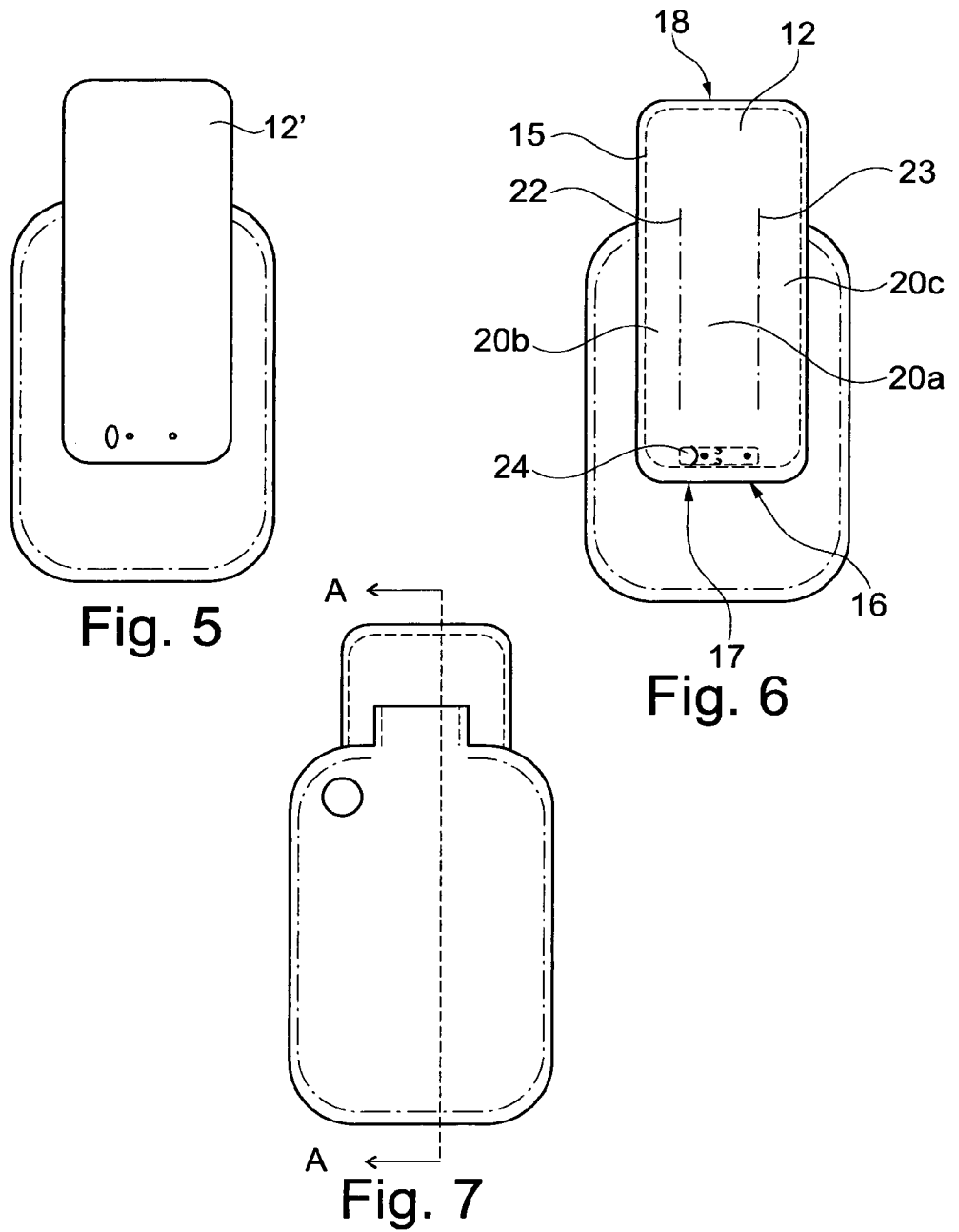
Fig. 5
Fig. 6
Fig. 7
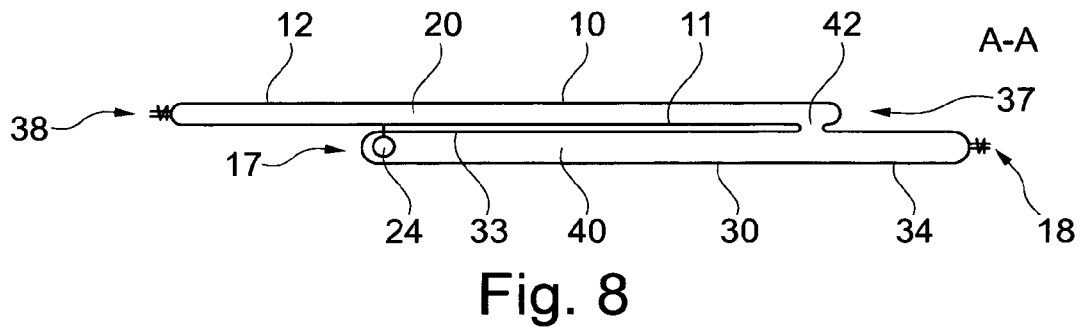
Fig. 8

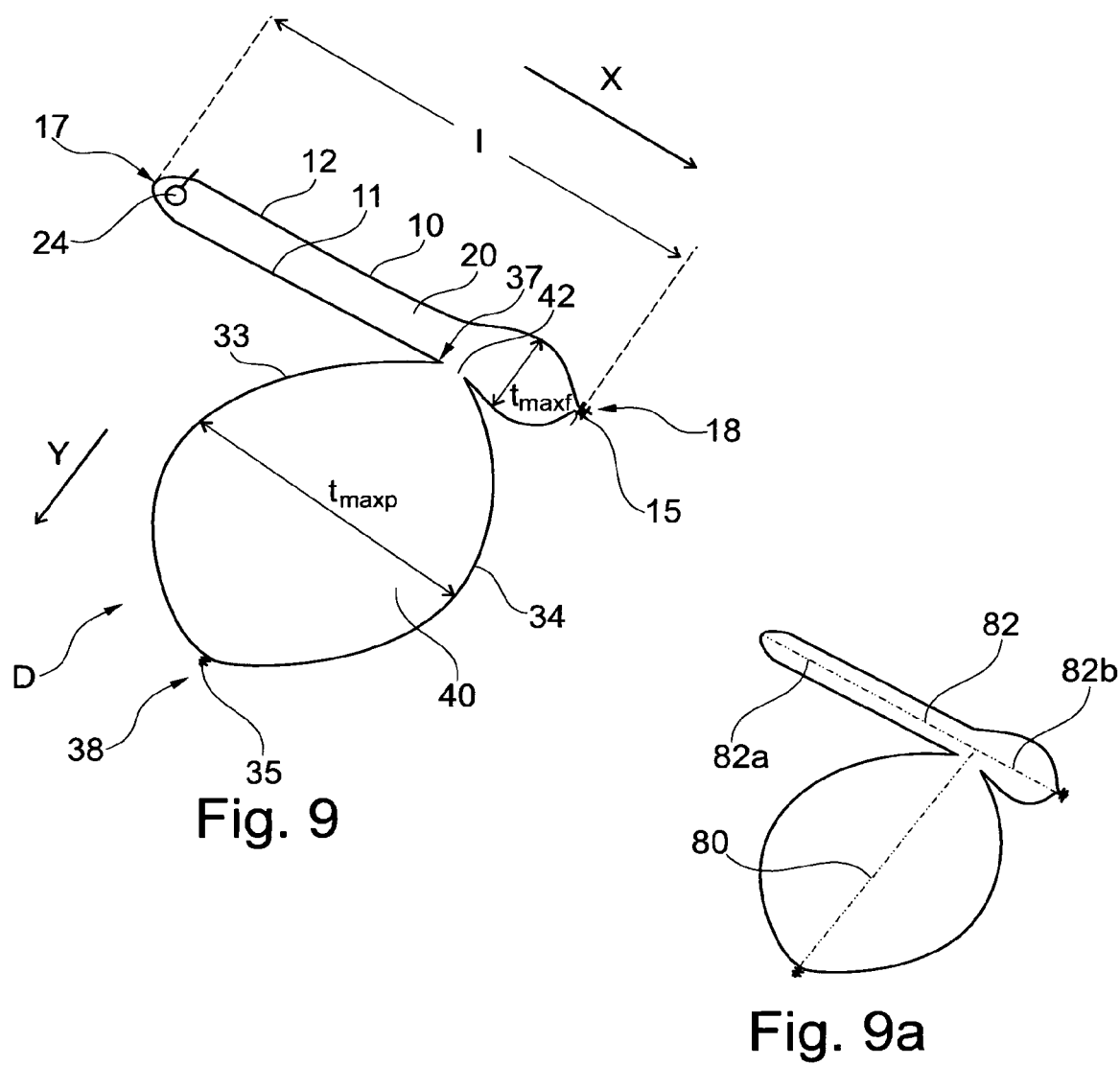
Fig. 9
Fig. 9a
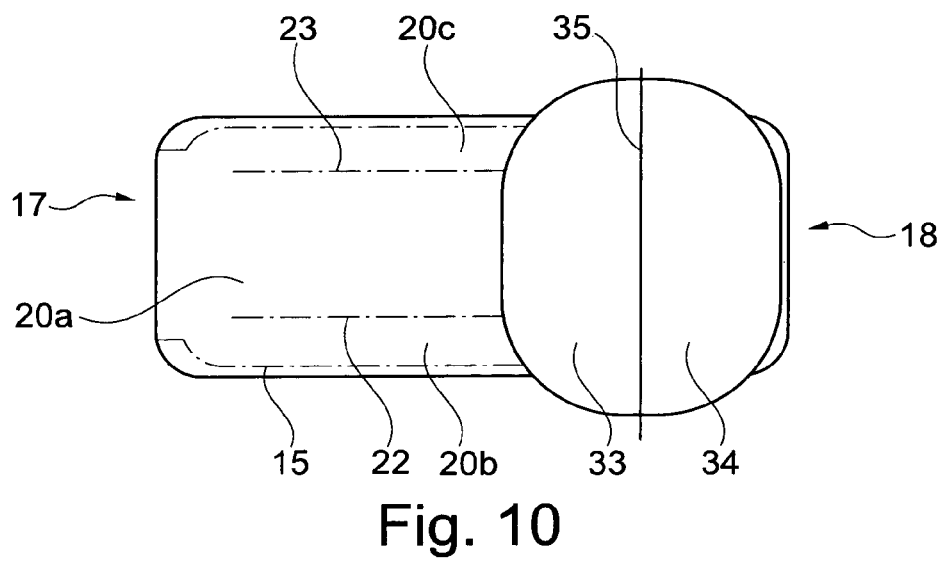
Fig. 10

FRONTAL AIRBAG UNIT AND MOTOR VEHICLE

BACKGROUND OF THE INVENTION

The invention relates to a frontal airbag unit according to the preamble of claim 1 as well as to a vehicle with such a frontal airbag unit according to claim 14.

Almost every modern passenger car shows a frontal airbag unit. Such a frontal airbag unit is still a key safety feature of a vehicle. In case of a driver frontal airbag unit this airbag unit is usually located in the hub area of the steering wheel. In case of a passenger frontal airbag unit this airbag unit is usually located inside the instrument panel. As every airbag unit, such a frontal airbag unit comprises an inflator and an airbag.

Especially in case of a passenger frontal airbag unit, but also in case of a driver frontal airbag unit it has been discussed to remove the frontal airbag unit from the instrument panel or steering wheel.

For example generic EP 2 686 206 B1 proposes to attach the frontal airbag unit to the roof of the vehicle rear the upper end of the windscreen, such that the frontal airbag is located above the person to be protected (the driver or the passenger) as long as the airbag of this airbag unit is not deployed. In case of deployment the frontal airbag unit of course remains attached the roof, but a part of the airbag is positioned in front of the person to be protected. By attaching the airbag unit to the roof (meaning that the un-deployed airbag is located above the person to be protected) space is saved in the instrument panel. The airbag of this airbag unit is comprised of a first outer skin defining a filling and support chamber and a second outer skin defining a protection chamber. One drawback of the frontal airbag unit described in generic EP 2 686 206 B1 is that the airbag of this airbag unit is complicated to manufacture.

SUMMARY

Starting from this prior art it is the task of this invention to provide a frontal airbag unit whose airbag is easy and cost effective to manufacture.

This task is solved by a frontal airbag unit according to claim 1. A motor vehicle with such a frontal airbag unit is defined in claim 14.

Like the airbag of the generic frontal airbag unit the airbag of the inventive airbag unit has a first outer skin enclosing a filling and support chamber and a second outer skin enclosing a protection chamber, wherein the two chambers are connected to one another by means of at least one overflow opening. According to the invention at least the first outer skin has a simple "2D" design, meaning that it is only comprised of two layers which are directly connected to one another by means of peripheral connection. This first outer skin enclosing the filling and support chamber is relatively thin, meaning that its length exceeds its maximum thickness at least by a factor 4 when in its fully deployed state.

The second outer skin can also be comprised of only two layers that are directly connected by means of a peripheral connection. This makes the assembly process even simpler. In this case it will often be preferred to assemble the complete airbag from only two cuttings, one for the first outer skin and one for the second outer skin.

But, if a large thickness and/or volume of the protection chamber and/or a special shape are needed, the second outer skin can also be comprised of at least one central panel and two side panels connecting the lateral edges of this central panel.

As will be seen later in view of the detailed description, such an airbag is very easy and cost effective to manufacture. Further this design has additional advantages. One key advantage is that the overall area of the outer skins is relatively small, such that packing space is saved. Further the overall volume of the deployed airbag is relatively small such that it can quickly be filled even with a small inflator. Another advantage is that the filling and support chamber itself can provide support for the protection chamber so that in many applications it will be sufficient to support the protection chamber only by the filling and support chamber such that no support by other vehicle parts such as the instrument panel is necessary. Further, by slight changes of the design this frontal airbag unit can easily be tuned to fit into different types of vehicles.

In many cases the protection chamber will be quite remote from the inflator. This makes it possible to choose a material (usually fabric) for the second outer skin which is thinner and lighter than the material of the first outer skin. "Lighter" means that it has less area weight.

Further preferred embodiments are defined in the subclaims.

BRIEF DESCRIPTION OF THE DRAWINGS

The invention will now be described by means of embodiments in view of the figures. The figures show.

DETAILED DESCRIPTION

In view of FIGS. 1 to 8 the assembly of a first embodiment of an inventive frontal airbag unit will now be described.

One will see that the assembly (meaning mainly the sewing processes) is easy to perform.

Figure 1:
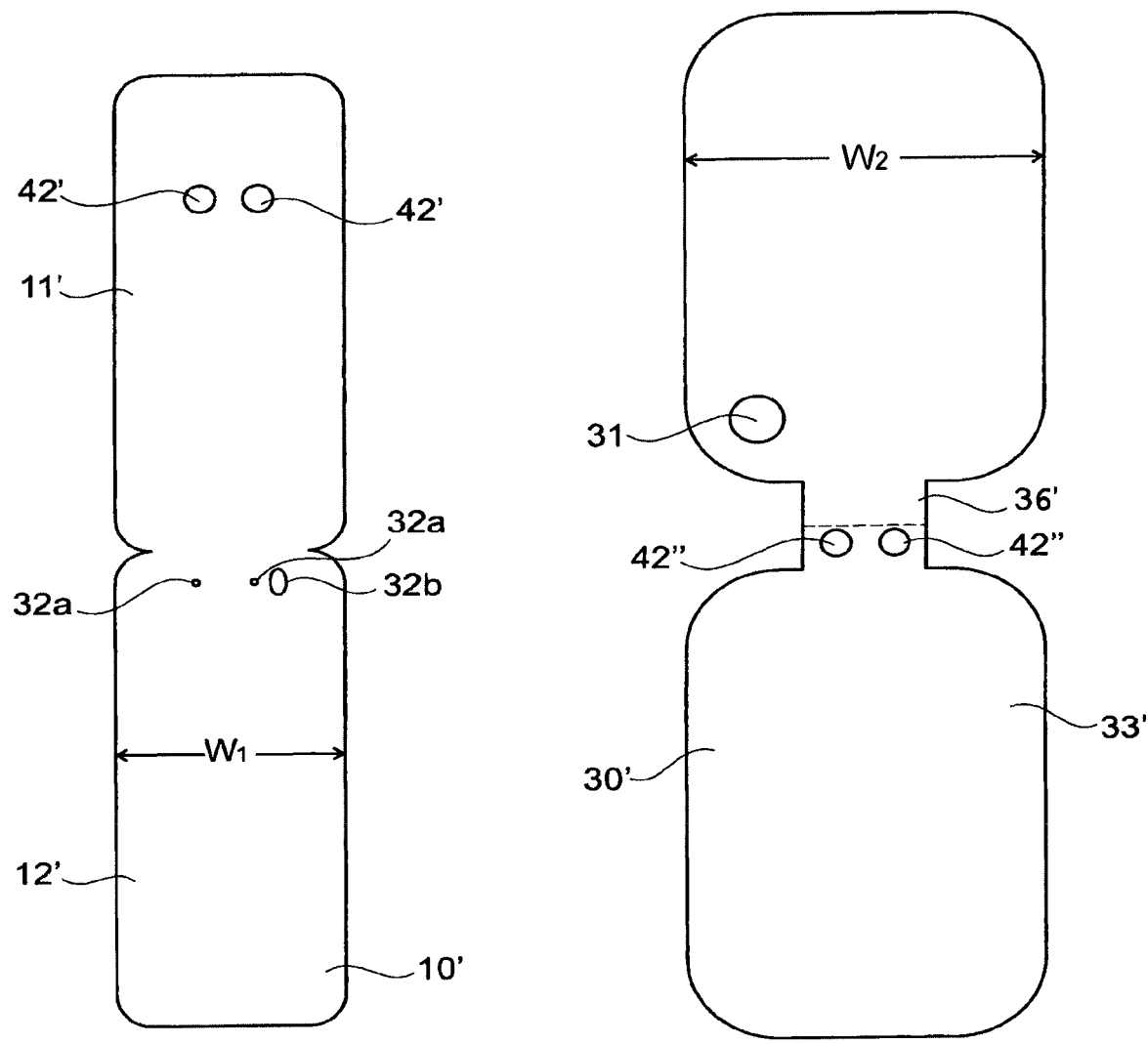
FIG. 1 all parts of a first embodiment of the inventive airbag unit in a completely unassembled state, FIG. 2 the two cuttings of FIG. 1 after a first assembly step, FIG. 3 what is shown in FIG. 2 after a subsequent assembly step, FIG. 4 the subassembly of FIG. 3 turned around, FIG. 5 what is shown in FIG. 5 after a folding step, FIG. 6 what is shown in FIG. 5 after applying of seams and inserting the inflator into the first outer skin, such that the assembly process is completed, FIG. 7 the airbag unit of FIG. 6 turned around, FIG. 8 what is shown in FIG. 7 in a sectional view taken along plane A-A in FIG. 7, FIG. 9 the frontal airbag unit of FIG. 8 whose airbag is completely deployed, FIG. 9a what is shown in FIG. 9 with two geometric lines indicating the geometrical structure of the cross-section of the airbag, FIG. 10 what is shown in FIG. 9 in a plan view from direction D, FIG. 11 the airbag unit of FIG. 9 installed into a vehicle, FIG. 12 a variation to what is shown in FIG. 11, FIG. 13 an embodiment of the invention wherein the frontal airbag unit is adapted for protecting the driver of a vehicle, FIG. 14 a variation to what is shown in FIG. 8 and FIG. 15 a further variation to what is shown in FIG. 8, FIG. 16 all parts of a further embodiment of the inventive airbag in a completely unassembled state and FIG. 17 the airbag made of the parts shown in FIG. 16 in its fully deployed state.

FIG. 1 shows all elements for producing the frontal airbag unit. These are only three elements, namely a cutting 10' for the first outer skin, a cutting 30' for the second outer skin and an inflator 24, which can be in form of a gas generator. In the embodiment described, the inflator 24 has a basically cylindrical main body and studs 25 extending from this main body.

The cutting 10' for the first outer skin is comprised of two basically rectangular and mirror-symmetrical areas, namely an area 11' for the first layer and an area 12' for the second layer. The area 11' shows at least one hole 42' for at least one overflow opening. In the embodiment shown two such holes 42' are present. The area 12' for the second layer shows two stud holes 32a and an insertion hole 32b for the inflator 24.

The cutting 30' for the second outer skin also comprises two areas, namely an area 33' for the third layer and an area 34' for the fourth layer. The position 36' for a fold is shown in FIG. 1 in dashed lines. Most of the areas of the third layer and the fourth layer are also basically rectangular shaped in this embodiment, but in the area of the connection of these two areas both areas have a reduced width.

The cutting 30' for the second outer skin shows a hole 42" for each hole 42' in the first cutting 11' for the first outer skin. So in this embodiment two such holes 42" are present. These holes 42" are located at or near the position 36' of the fold. In the embodiment shown these holes 42" are located in the area of the third layer 33', but they could also be located in the area 34' of the fourth layer, or they could be located partially in the area 33' and in the area 34', especially symmetrical to the folding line 36'. In many cases the exact position of these holes 42" will have an influence on the angle between the two outer skins when the airbag is deployed, so the choosing of this position can be used for the fine-tuning of the airbag. Further, the cutting 30' shows at least one ventilation hole 31.

In the embodiment shown the width $w_2$ of the second outer skin exceeds the width $w_1$ of the first outer skin.

Figure 2:
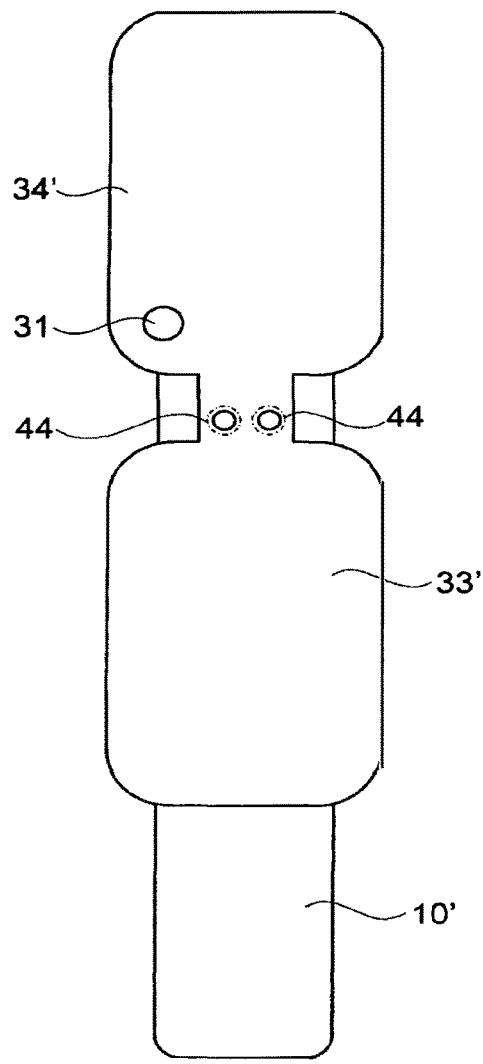

In the first assembly step shown in FIG. 2 the cutting 30' for the second outer skin is laid on top of the cutting 10' for the first outer skin such that the holes 42' and 42" are flush. In this state connection seams 44 encircling the holes are applied. In case of only one overflow opening only one such connection seam 44 will be present.

In the next step the cutting 30' is folded along the folding line 36' such that the two areas 33' and 34' are on top of one another and a fold 36 is created. Now a peripheral seam 35 is applied such that a closed outer skin, namely the second outer skin 30 consisting of a third layer 33 and a fourth layer 34 is created. The peripheral connection closing this second outer skin 30 is comprised of the peripheral seam 35 and the fold 36 (FIG. 3).

If one uses a sewing machine which has an arm that can extend through the holes 42', 42', it is also possible to first close the second outer skin 30 and then sew it to the first cutting 10' by means of the connection seam(s) 44.

Figure 3:
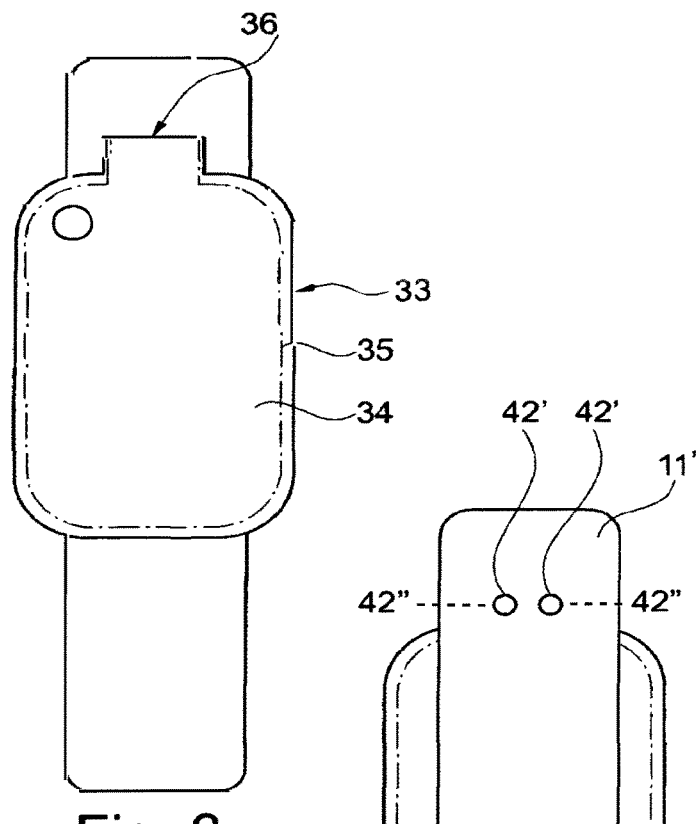
Figure 4:
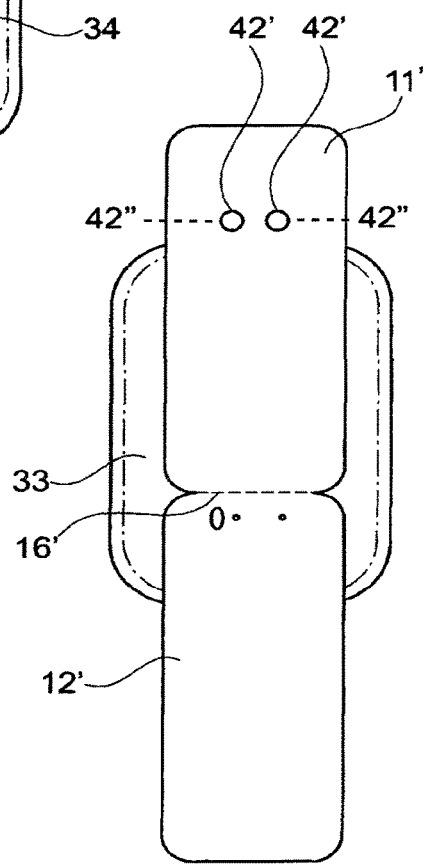

FIG. 4 shows the subassembly of FIG. 3 turned around such that the first cutting 10' is on top. This cutting 10' is now folded along folding line 16' such that the congruent areas 11' and 12' are on top of each other. This is shown in FIG. 5. In the next step the peripheral seam 15 and two dividing seams 22, 23 are applied. The peripheral seam 15 and the fold 16 form the peripheral connection such that the first outer skin 10 is closed and encloses the filling and support chamber. The first outer skin extends in the first direction (X direction) from a first end 17 to a second end 18. The dividing seams 22, 23 also extend in the first direction and they start near the first end 17 and end approximately at the position of the overflow opening which is formed by the two holes 42' and 42". These dividing seams 22, 23 divide the filling and support chamber into three sub-chambers, namely two lateral sub-chambers 20b, 20c and a central sub-chamber 20a. Between the overflow opening 42 and the second end 18 the filling and support chamber 20 is not divided. In the section of the first outer skin 10 through which the dividing seams 22, 23 extend, the first outer skin 10 has a structure similar to the structure of an air mattress.

In the last assembly step the inflator 24 is inserted through the insertion hole 32b. The studs 25 of the inflator 24 extend through the stud holes 32a.

FIGS. 7 and 8 show the frontal airbag unit of FIG. 6, wherein in FIG. 7 the frontal airbag unit of FIG. 6 is turned around and FIG. 8 is a sectional view taken along plane A-A in FIG. 7.

FIGS. 9, 9a and 10 show the frontal airbag unit just described when the airbag of this frontal airbag unit is in its fully deployed state. One can see the following relevant features:

In the deployed state the first outer skin 10 has a length I and the filling and support chamber 20 enclosed by this first outer skin 10 has a maximum thickness $t_{maxf}$. This maximum thickness is of course reached in the area free of the dividing seams 22, 23. The first outer skin 10 is flat meaning that the length I exceeds the maximum thickness $t_{maxf}$ at least by a factor 4. One can also see that the overflow opening 42 is remote from the second end 18, wherein the distance between the overflow opening 42 and the second end 18 is at least a fifth of the length I. The second outer skin 30 extends from the first outer skin 10 in a second direction Y which is basically perpendicular to first direction X. In the embodiment shown the maximum thickness $t_{maxp}$ of the protection chamber 40 exceeds the maximum thickness $t_{maxf}$ of the filling and support chamber 20 at least by a factor 3.

As can especially be seen from FIG. 9a, the cross-section of the airbag can be looked at as being basically "asymmetrically T-shaped" with the main beam 80 extending from the fourth to the third end of the protection chamber 40 and the cross beam extending from the first end to the second end of the filling and support chamber 20. The inflator remote section of the cross beam, the support section 82b, is shorter than the inflator-side section 82a of the cross beam. The support section 82b supports the protection chamber 40 against the windshield when the protection chamber restrains the person to be protected as will be seen later.

This support section of the filling and support chamber 20 extends from the overflow opening 42 to the second end 18. In most cases the T will be asymmetrical as just described, but it might also be symmetrical.

Figure 11:
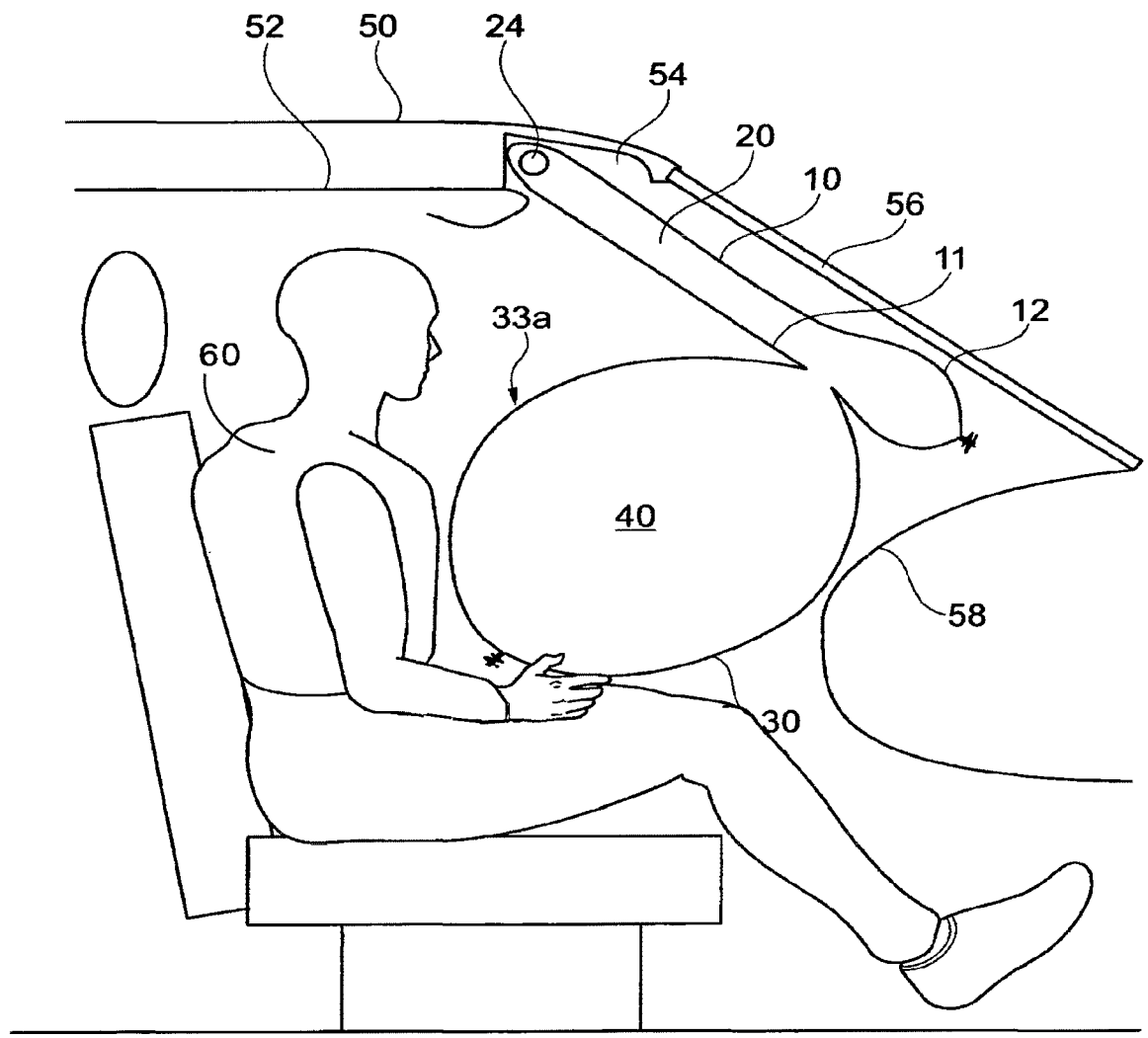

FIG. 11 shows the frontal airbag unit just described being installed into a vehicle and in its fully deployed state as shown in FIGS. 9 and 10. In its un-deployed state the frontal airbag unit is housed in a housing 54. This housing 54 is located between the outer roof 50 of the vehicle and a ceiling cladding 52. The housing is adjacent to the windscreen 56.

One can see that the deployed filling and support chamber basically extends parallel to the windscreen 56 and that the protection chamber 40 is positioned in front of the passenger 60. The impact surface 33a of the second outer skin 30 faces the thorax and the head of this passenger.

When the passenger 60 is restrained by the second outer skin 30 (meaning by the protection chamber 40) the second outer skin 30 is supported by the instrument panel 58 and by the filling and support chamber 20.

Figure 12:
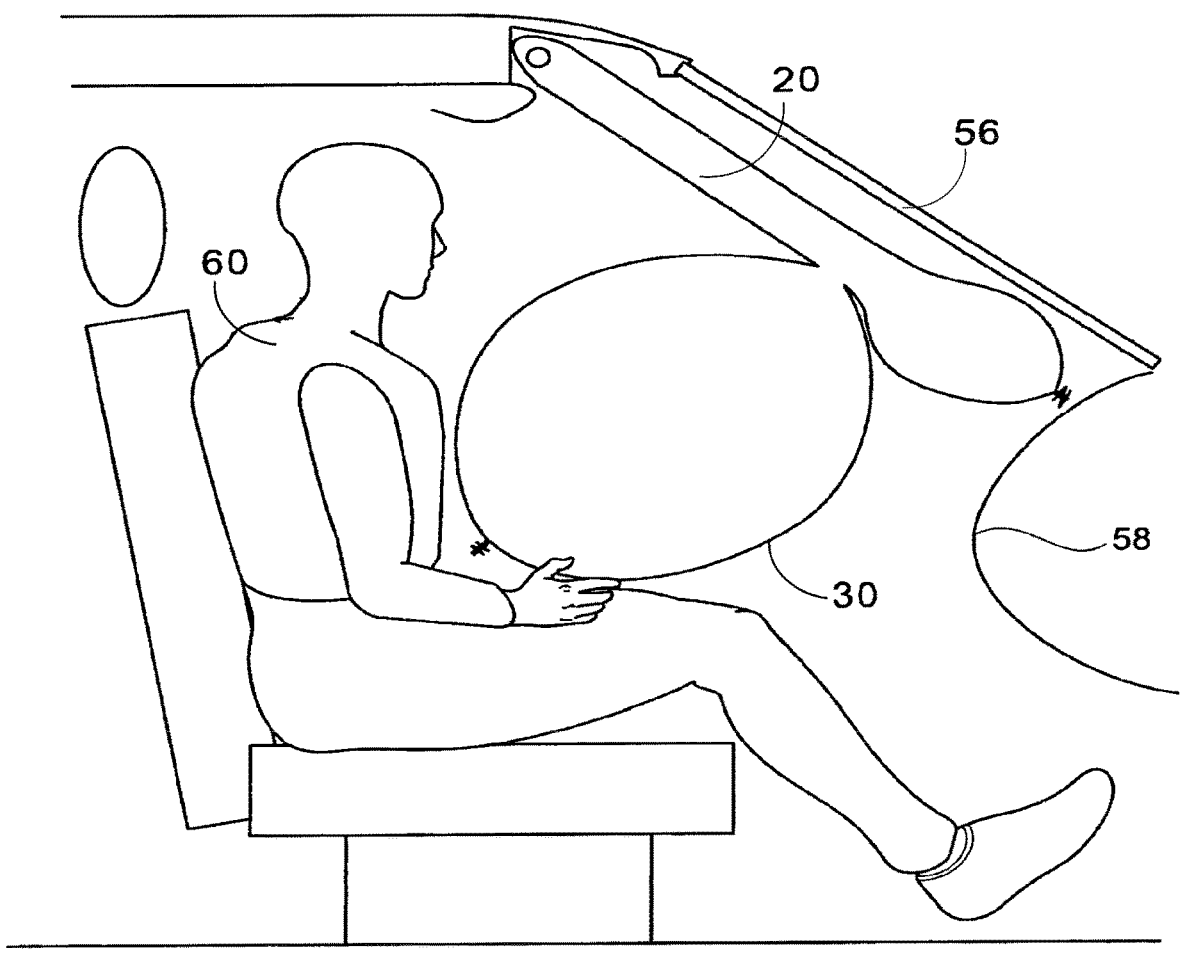

FIG. 12 shows an embodiment of a vehicle and the frontal airbag unit in which the instrument panel 58 is further away from the passenger 60. Here is it possible that the second outer skin 30 is exclusively supported by the filling and support chamber 20, which in turn is supported by the windscreen 56.

Figure 13:
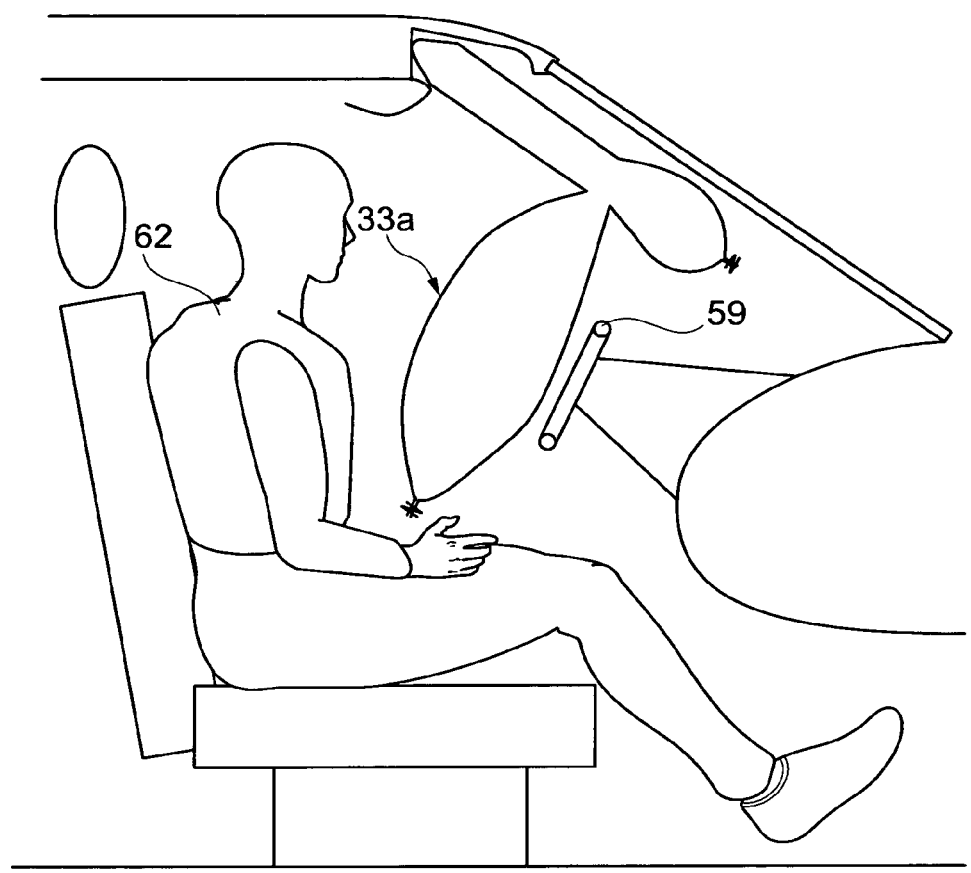

As is shown in FIG. 13, the application can also be applied to a driver frontal airbag unit. Here, the support chamber 40 is at least partially located in front of the steering wheel 59. Here the maximum thickness of the protection chamber 40 can be smaller as in the case of a passenger frontal airbag unit. Further it is possible that the maximum length of the first outer skin 10 is smaller than the length of the first outer skin of a passenger frontal airbag unit.

Figure 14:
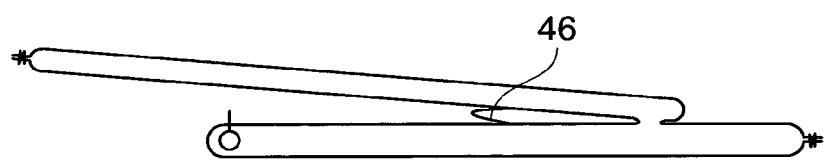
Figure 15:
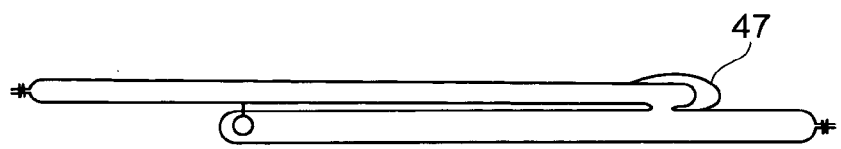

In order to tune the angle between the first outer skin 10 and the second outer skin outer tethers 46, 47 can be attached to the first outer skin 10 and the second outer skin 30 as is shown in FIGS. 14 and 15.

The concept of providing a "2D" first outer skin (meaning being comprised of only two layers) which is deployed first has several advantages: The first outer skin is of low mass leading to a quick complete positioning. The 2D-structure allows optimizing the surface of the first outer skin for the contact to the windscreen and to the second outer skin. Especially, large contact surfaces (to the windscreen as well as to the second outer skin can be generated. The structure of the first outer skin makes the deployed first outer skin very stiff in itself. All this leads to a very good support of the deployed second outer skin.

Figure 16:
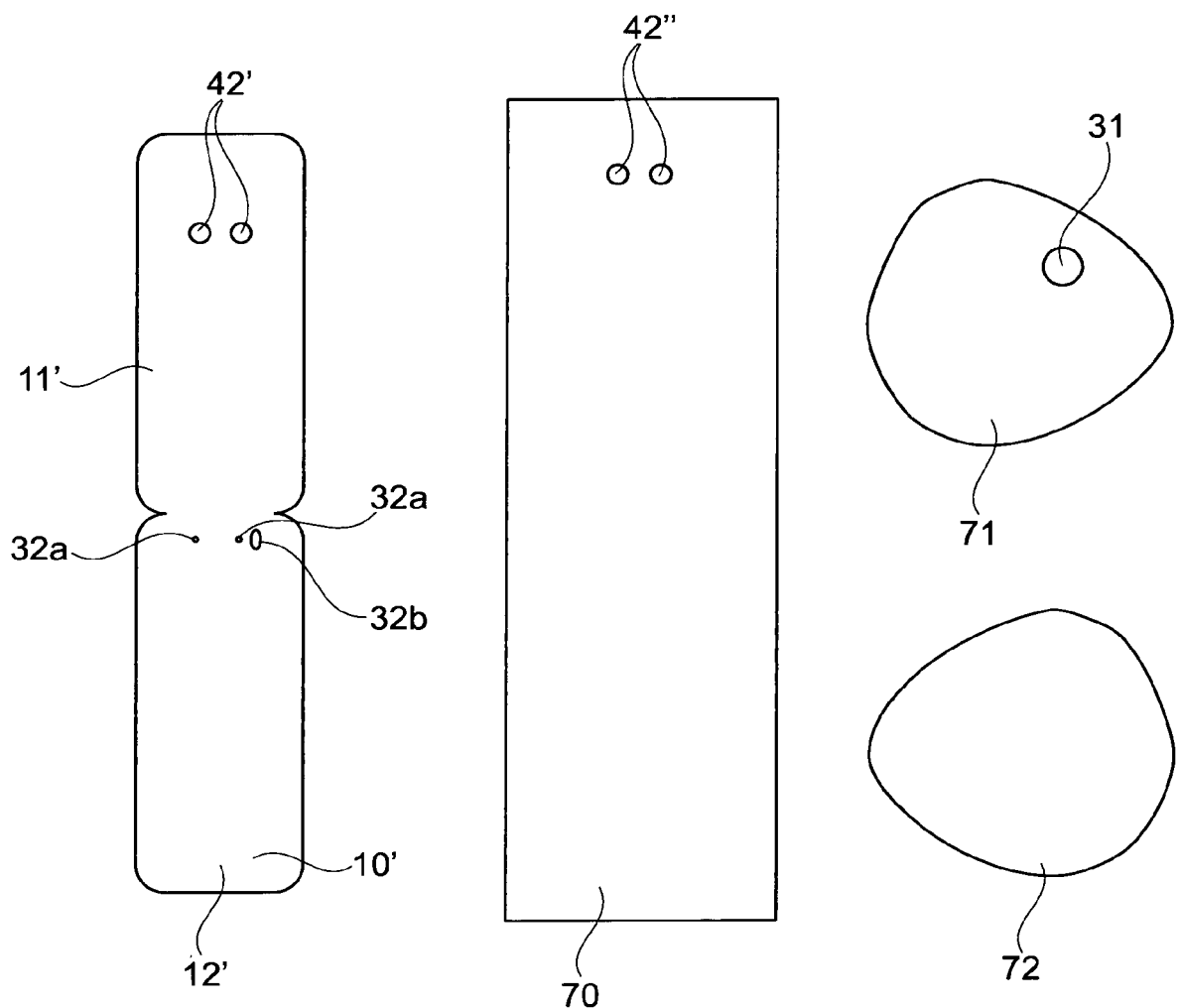

FIG. 16 shows all parts of an embodiment of the invention which differs from the embodiments described until now in the structure of the second outer skin enclosing the protection chamber. In the above embodiments this second outer skin has a "2D" structure meaning that it is comprised of exactly two layers. In the embodiment of FIG. 16 the second outer skin has a "3D" structure meaning that it is comprised of at least one central panel 70 and two side panels 71, 72, wherein it is preferred that the second outer skin 30 comprises (as shown) exactly one central panel 70.

Figure 17:
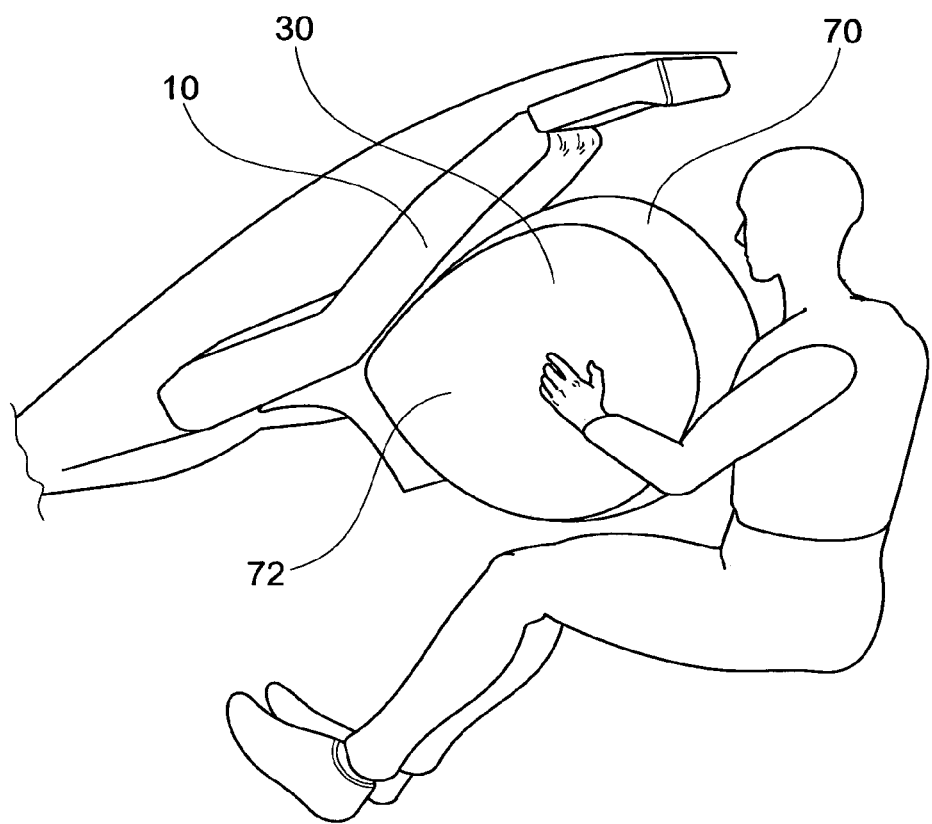

The sewing process is basically as described above with the exception that the second outer skin is not closed by applying closing seams which connect directly two basically parallel extending layers to one another, but by sewing a side panel 71, 72 to each longitudinal edge of the central panel 70 by means of a closed closing seam Additionally the two short edges of the central panel 70 are sewn to one another. This sewing process is generally known from "3D" airbags. The completely deployed airbag is shown in FIG. 17.

The structure of the first outer skin 10 can be exactly as described above; especially it can have the "air mattress structure" between the first end and the overflow opening, such that the above described advantages are maintained.

It is to be noted that according to current knowledge it is preferred that the seams are seams in the classical sense (consisting of at least one thread), but it needs to be noted that other kinds of connections like gluing or welding could also be used to form the "seams" without leaving the spirit of the invention.

LIST OF REFERENCE NUMBERS 10 first outer skin
10' cutting for first outer skin
11 first layer
11' area of first layer
12 second layer
12' area of second layer
15 peripheral seam
16 fold
17 first end
18 second end
20 filling and support chamber
20a central sub-chamber
20b, c lateral sub-chamber
22, 23 dividing seam
24 inflator
25 stud
30 second outer skin
30' cutting for second outer skin
31 ventilation hole
32a stud hole
32b insertion hole
33 third layer
33' area of third layer
33a impact surface
34 fourth layer
34' area of fourth layer
35 peripheral seam
36 fold
36' position of fold
37 third end
38 fourth end
40 protection chamber
42 overflow opening
42' hole in first layer
42' hole in second cutting
44 connection seam
46 tether between first and third layer
47 tether between second and fourth layer
50 roof
52 cladding
54 housing
56 windscreen
58 instrument panel
59 steering wheel
60 passenger
62 driver
70 central panel
71, 72 side panel
80 main beam
82 cross beam
82a inflator-side section
82b support section

The invention claimed is:

1. A frontal airbag unit adapted for being mounted above a person to be protected, with an inflator and an airbag, said airbag comprising:
a first outer skin extending in a first direction from an inflator-side first end to a second end when in its deployed state, and defining a filling and support chamber being in fluid communication with the inflator, said filling and support chamber having a first maximum thickness; and
a second outer skin comprising an impact surface and defining a protection chamber being in fluid communication with the filling and support chamber via at least one overflow opening,
wherein the first outer skin is comprised of a first layer and a second layer, said first layer and said second layer being connected to one another by a first peripheral connection, wherein a length of the first outer skin between the first end and the second end exceeds the first maximum thickness of the filling and support chamber by at least a factor of 4, wherein the at least one overflow opening is located at the first laver between the first end and the second end, and wherein a distance between the at least one overflow opening and the second end is at least a fifth of the length of the first outer skin.

2. The frontal airbag unit of claim 1, wherein the second outer skin is comprised of a third layer comprising the impact surface and a fourth layer, said third layer and said fourth layer being connected to one another by a second peripheral connection, said second outer skin extending in a second direction from a third end to a fourth end when in its deployed state.

3. The frontal airbag unit of claim 2, wherein the at least one overflow opening is located at the third end of the second outer skin between the third layer and the fourth layer.

4. The frontal airbag unit of claim 2, wherein g plane defined by the first peripheral connection and a plane defined by the second peripheral connection enclose an angle between 70° and 130°.

5. The frontal airbag unit of claim 1, wherein the second outer skin is comprised of at least one central panel and two side panels.

6. The frontal airbag unit of claim 1, wherein the filling and support chamber is divided into at least two sub-chambers extending in the first direction by a dividing connection connecting the first layer and the second layer.

7. The frontal airbag unit of claim 6, wherein two dividing connections are present such that the filling and support chamber is divided into two lateral sub-chambers and one central sub-chamber.

8. The frontal airbag unit of claim 7, wherein the at least one overflow opening connects the central sub-chamber to the protection chamber.

9. The frontal airbag unit of claim 8, wherein the dividing connection ends remote from the second end, such that g thickness of the filling and support chamber is increased near the second end, wherein a distance between the end of the dividing connection and the second end is the same as a distance between the at least one overflow opening and the second end.

10. The frontal airbag unit of claim 7, wherein the second outer skin includes at least one ventilation opening and that the first outer skin does not show a ventilation opening.

11. The frontal airbag unit of claim 6, wherein the dividing connection ends remote from the second end, such that a thickness of the filling and support chamber is increased near the second end, wherein a distance between the end of the dividing connection and the second end is the same as a distance between the at least one overflow opening and the second end.

12. The frontal airbag unit of claim 1, wherein the second outer skin includes at least one ventilation opening and that the first outer skin does not show a ventilation opening.

13. The frontal airbag unit of claim 1, wherein a maximum thickness of the protection chamber exceeds the first maximum thickness of the filling and support chamber at least by a factor of 2.

14. The frontal airbag unit of claim 1, wherein a material of the second outer skin has less area weight than a material of the first outer skin.

15. A motor vehicle having a roof, a windscreen extending from said roof and a frontal airbag unit with an inflator and an airbag, said airbag comprising:

a first outer skin extending in a first direction from an inflator-side first end to a second end when in its deployed state, and defining a filling and support chamber being in fluid communication with the inflator, said filling and support chamber having a first maximum thickness; and a second outer skin comprising an impact surface and defining a protection chamber being in fluid communication with the filling and support chamber via at least one overflow opening, wherein the first outer skin is comprised of a first layer and a second layer, said first layer and said second layer being connected to one another by a first peripheral connection, wherein a length of the first outer skin between the first end and the second end exceeds the first maximum thickness of the filling and support chamber by at least a factor of 4, wherein the filling and support chamber extends parallel to the windscreen when the airbag is fully deployed, wherein the filling and support chamber is divided into at least two sub-chambers extending in the first direction by a dividing connection connecting the first laver and the second layer, and wherein two dividing connections are present such that the filling and support chamber is divided into two lateral sub-chambers and one central sub-chamber.

16. The motor vehicle of claim 15, wherein the at least one overflow opening connects the central sub-chamber to the protection chamber.

\* \* \* \* \*